(12) United States Patent
Macholz

(10) Patent No.: US 8,400,572 B2
(45) Date of Patent: Mar. 19, 2013

(54) INTERCHANGEABLE SWITCH ASSEMBLY FOR MEDIA DEVICE

(75) Inventor: Jeff Macholz, Patchogue, NY (US)

(73) Assignee: Voxx International Corporation, Hauppauge, NY (US)

( * ) Notice: Subject to any disclaimer, the term of this patent is extended or adjusted under 35 U.S.C. 154(b) by 1425 days.

(21) Appl. No.: 11/691,168

(22) Filed: Mar. 26, 2007

(65) Prior Publication Data

US 2007/0242172 A1 Oct. 18, 2007

Related U.S. Application Data

(63) Continuation-in-part of application No. 11/229,215, filed on Sep. 16, 2005, now Pat. No. 7,548,413.

(51) Int. Cl.
*H04N 5/64* (2006.01)
(52) U.S. Cl. ...................................................... 348/837
(58) Field of Classification Search .................. 348/836, 348/837, 838, 839, 843, E05.128
See application file for complete search history.

(56) References Cited

U.S. PATENT DOCUMENTS

| | | | | |
|---|---|---|---|---|
| 4,681,366 A | * | 7/1987 | Lobanoff | 297/188.06 |
| 5,010,437 A | * | 4/1991 | Utsugi et al. | 360/137 |
| 5,128,829 A | | 7/1992 | Loew | |
| 5,177,730 A | * | 1/1993 | Utsugi | 720/646 |
| 5,214,574 A | | 5/1993 | Chang | |
| 5,506,563 A | * | 4/1996 | Jonic | 340/426.34 |
| 5,551,497 A | | 9/1996 | Stanley | |
| 5,554,966 A | * | 9/1996 | Iijima et al. | 340/687 |
| 5,705,976 A | * | 1/1998 | Howard | 340/426.34 |
| 5,831,344 A | * | 11/1998 | Rose, Sr. | 307/10.3 |
| 5,835,344 A | | 11/1998 | Alexander | |
| 5,848,042 A | * | 12/1998 | Takahashi et al. | 720/647 |
| 5,852,594 A | * | 12/1998 | Kaise et al. | 720/647 |
| 5,953,302 A | * | 9/1999 | Kobayashi | 720/647 |
| 5,986,634 A | | 11/1999 | Alioshin et al. | |
| 6,109,434 A | | 8/2000 | Howard, Jr. | |
| 6,149,116 A | | 11/2000 | Won | |
| 6,186,459 B1 | * | 2/2001 | Ma | 248/276.1 |
| 6,347,796 B1 | | 2/2002 | Grossman et al. | |
| 6,483,428 B1 | * | 11/2002 | Fish et al. | 340/425.5 |
| 6,491,194 B2 | | 12/2002 | Marvin | |
| 6,501,719 B1 | * | 12/2002 | Hada et al. | 720/646 |
| 6,520,607 B2 | | 2/2003 | Pfaff | |
| 6,536,589 B2 | | 3/2003 | Chang | |
| 6,561,702 B1 | | 5/2003 | Yik | |
| 6,675,232 B1 | * | 1/2004 | Sato et al. | 710/8 |
| 6,678,166 B1 | * | 1/2004 | Gupta et al. | 361/759 |
| 6,705,688 B2 | * | 3/2004 | Tobishima | 312/223.1 |
| 6,871,356 B2 | * | 3/2005 | Chang | 725/75 |
| 6,882,524 B2 | | 4/2005 | Ulla | |
| 6,935,597 B2 | * | 8/2005 | Shibuya | 248/27.1 |
| 6,961,239 B2 | * | 11/2005 | Schedivy | 361/679.29 |
| 7,004,397 B2 | * | 2/2006 | Fujita et al. | 235/476 |
| 7,019,794 B2 | * | 3/2006 | Norvell et al. | 348/838 |
| D518,293 S | | 4/2006 | Lam | |
| D521,524 S | | 5/2006 | Chang | |
| 7,040,698 B2 | * | 5/2006 | Park et al. | 297/217.3 |
| 7,044,546 B2 | * | 5/2006 | Chang | 297/217.3 |
| 7,084,932 B1 | * | 8/2006 | Mathias et al. | 348/837 |
| 7,117,510 B2 | * | 10/2006 | Lu et al. | 720/647 |
| 7,127,726 B2 | * | 10/2006 | Tobishima et al. | 720/600 |

(Continued)

*Primary Examiner* — William Gilbert
*Assistant Examiner* — James Ference
(74) *Attorney, Agent, or Firm* — F. Chau & Associates, LLC

(57) ABSTRACT

A media device for a vehicle includes an interchangeable switch assembly, and a console including a receiving part accommodating the interchangeable switch assembly. The interchangeable switch assembly includes a switch panel and a circuit board. The interchangeable switch assembly further includes a backlight unit for providing light to the switch panel.

6 Claims, 10 Drawing Sheets

U.S. PATENT DOCUMENTS

| | | | |
|---|---|---|---|
| 7,143,424 B2* | 11/2006 | Lu | 720/647 |
| 7,180,735 B2 | 2/2007 | Thomas et al. | |
| 7,184,259 B2* | 2/2007 | Marler et al. | 361/679.23 |
| 7,245,274 B2* | 7/2007 | Schedivy | 345/7 |
| 7,379,125 B2* | 5/2008 | Chang | 348/837 |
| 7,416,439 B2* | 8/2008 | Macholz | 439/501 |
| 7,604,273 B2* | 10/2009 | Vitito | 296/37.8 |
| 7,609,946 B2* | 10/2009 | Schedivy | 386/200 |
| 7,636,930 B2* | 12/2009 | Chang | 725/75 |
| 7,780,231 B2* | 8/2010 | Shalam et al. | 297/217.3 |
| 2001/0001319 A1* | 5/2001 | Beckert et al. | 701/36 |
| 2002/0024597 A1* | 2/2002 | Arai et al. | 348/148 |
| 2002/0135231 A1* | 9/2002 | Miura | 307/10.1 |
| 2002/0159270 A1 | 10/2002 | Lynam et al. | |
| 2003/0025367 A1* | 2/2003 | Boudinot | 297/217.3 |
| 2003/0042378 A1* | 3/2003 | Imamura et al. | 248/274.1 |
| 2003/0057749 A1* | 3/2003 | Buono | 297/217.3 |
| 2003/0111880 A1* | 6/2003 | Lambiaso | 297/217.3 |
| 2003/0137584 A1* | 7/2003 | Norvell et al. | 348/61 |
| 2003/0222848 A1* | 12/2003 | Solomon et al. | 345/156 |
| 2004/0007906 A1* | 1/2004 | Park et al. | 297/217.3 |
| 2004/0021947 A1* | 2/2004 | Schofield et al. | 359/601 |
| 2004/0053520 A1* | 3/2004 | Reinhardt et al. | 439/65 |
| 2004/0175155 A1 | 9/2004 | Liu | |
| 2004/0194154 A1* | 9/2004 | Meadors et al. | 725/153 |
| 2005/0005298 A1* | 1/2005 | Tranchina | 725/81 |
| 2005/0020320 A1* | 1/2005 | Lavelle et al. | 455/569.2 |
| 2005/0021190 A1 | 1/2005 | Worrell et al. | |
| 2005/0024356 A1* | 2/2005 | Lavelle et al. | 345/204 |
| 2005/0099042 A1* | 5/2005 | Vitito | 297/217.3 |
| 2005/0099547 A1* | 5/2005 | Vitito | 348/739 |
| 2005/0099548 A1* | 5/2005 | Vitito | 348/837 |
| 2005/0110313 A1* | 5/2005 | Vitito et al. | 297/217.3 |
| 2005/0132407 A1* | 6/2005 | Boyer et al. | 725/77 |
| 2005/0146792 A1* | 7/2005 | Schofield et al. | 359/604 |
| 2005/0162376 A1* | 7/2005 | Sunoue et al. | 345/104 |
| 2005/0166238 A1* | 7/2005 | Vitito | 725/77 |
| 2005/0185916 A1 | 8/2005 | Jost et al. | |
| 2005/0200697 A1* | 9/2005 | Schedivy et al. | 348/61 |
| 2005/0204596 A1* | 9/2005 | Peng | 40/320 |
| 2005/0235327 A1* | 10/2005 | Vitito | 725/77 |
| 2005/0242636 A1* | 11/2005 | Vitito | 297/217.3 |
| 2005/0242637 A1* | 11/2005 | Vitito | 297/217.3 |
| 2005/0242638 A1* | 11/2005 | Vitito | 297/217.3 |
| 2006/0023412 A1* | 2/2006 | Schedivy | 361/683 |
| 2006/0028731 A1* | 2/2006 | Schofield et al. | 359/604 |
| 2006/0047426 A1* | 3/2006 | Vitito | 701/213 |
| 2006/0061008 A1 | 3/2006 | Karner et al. | |
| 2006/0070102 A1* | 3/2006 | Vitito | 725/77 |
| 2006/0070103 A1* | 3/2006 | Vitito | 725/77 |
| 2006/0097537 A1 | 5/2006 | Schedivy | |
| 2006/0098403 A1* | 5/2006 | Smith | 361/683 |
| 2006/0109388 A1* | 5/2006 | Sanders et al. | 348/837 |
| 2006/0125295 A1 | 6/2006 | Schedivy | |
| 2006/0128303 A1* | 6/2006 | Schedivy | 455/3.06 |
| 2006/0148575 A1* | 7/2006 | Vitito | 463/46 |
| 2006/0161713 A1 | 7/2006 | Belady | |
| 2007/0070192 A1* | 3/2007 | Shalam | 348/61 |
| 2007/0091015 A1* | 4/2007 | Lavelle et al. | 345/55 |
| 2007/0171316 A1 | 7/2007 | Mathias et al. | |
| 2007/0242172 A1* | 10/2007 | Macholz | 348/837 |

* cited by examiner

INTERCHANGEABLE SWITCH ASSEMBLY FOR MEDIA DEVICE

CROSS REFERENCE TO RELATED APPLICATION

This application is a Continuation-in-Part of U.S. application Ser. No. 11/229,215, filed on Sep. 16, 2005, now U.S. Pat. No. 7,548,413, the disclosure of which is incorporated herein in its entirety by reference.

BACKGROUND OF THE INVENTION

1. Technical Field

The present disclosure relates to a switch assembly for a media device for a vehicle, and more particularly to an interchangeable switch assembly for a media device for a vehicle.

2. Discussion of Related Art

Media devices for a vehicle, such as an overhead display and a headrest display, are popular because passengers can enjoy audio and video entertainment on the road. Conventionally, a switch assembly including, for example, a panel having control buttons and a circuit board having circuitry for controlling the media device is not interchangeable from the console of the media device. A switch assembly may have a design or look in connection with a particular brand. In the market, one brand of a media device may be more popular than another even though both brands may function essentially the same. When the demand for the popular brand increases, and the demand for the unpopular brand decreases, the unpopular brand may be overstocked.

Therefore, there is a need for an interchangeable switch assembly for vehicle media devices to replace the switch assembly of the unpopular brand with the switch assembly of the more popular brand.

SUMMARY OF THE INVENTION

According to an embodiment of the present invention, a media device for a vehicle includes an interchangeable switch assembly, and a console including a receiving part accommodating the interchangeable switch assembly.

The interchangeable switch assembly may include a switch panel and a circuit board.

The interchangeable switch assembly may further include a backlight unit for providing light to the switch panel.

The console may further include an opening for receiving a data source.

The opening may further include a light pipe formed around the opening.

A light source of the light pipe may be changeable between at least two colors.

The console may include a switch for selecting a color of the light source.

The backlight unit and the light pipe may display a same color.

The light pipe may comprise a transparent plastic material.

The switch panel may include a plurality of buttons.

The circuit board may include at least a mating pin connector.

The interchangeable assembly can be mounted to the console by screws.

According to an embodiment of the present invention, a media device for a vehicle includes an interchangeable switch assembly, a console including a receiving part accommodating the interchangeable switch assembly, a media player disposed in the housing, wherein the media player receives a data source through an opening in the console, and a display attached to the console for displaying image using the data.

According to an embodiment of the present invention, a method for changing a switch assembly in a media device for a vehicle includes removing a first switch assembly having a backlight unit of a first color from a console of the media device, disposing a second switch assembly having a backlight unit of a second color to the console of the media device, and selecting the second color as an illuminating color of a light pipe formed around an opening in the console.

BRIEF DESCRIPTION OF DRAWINGS

Exemplary embodiments of the present invention can be understood in more detail from the following descriptions taken in conjunction with the accompanying drawings, of which.

DETAILED DESCRIPTION OF EXEMPLARY EMBODIMENTS

Exemplary embodiments of the present invention will now be described more fully hereinafter below in more detail with reference to the accompanying drawings. This invention may, however, be embodied in different forms and should not be construed as limited to the embodiments set forth herein.

Figure 1:
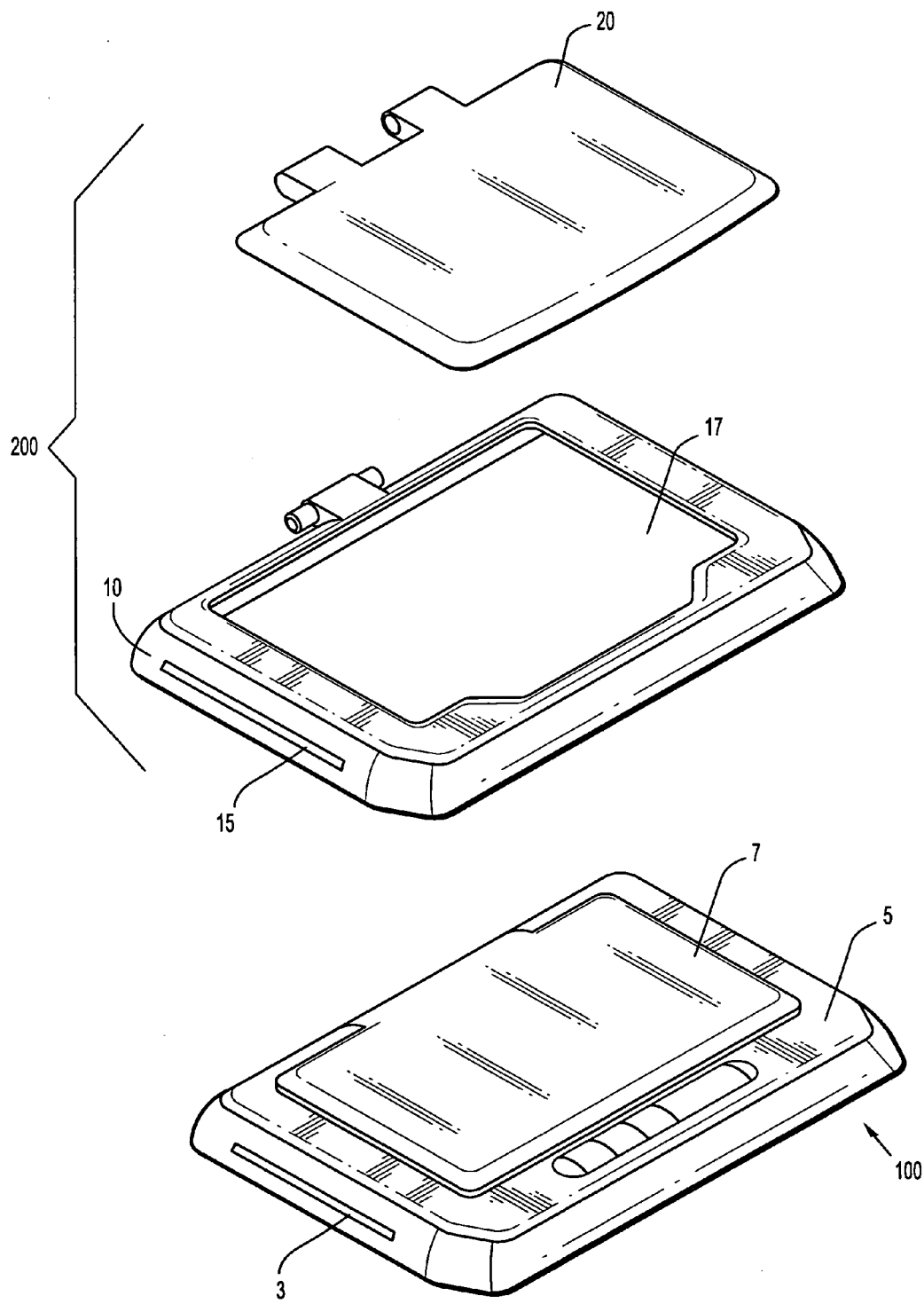
FIG. 1 is an exploded perspective view of a cover for an overhead media device according to an embodiment of the present invention.
Figure 4:
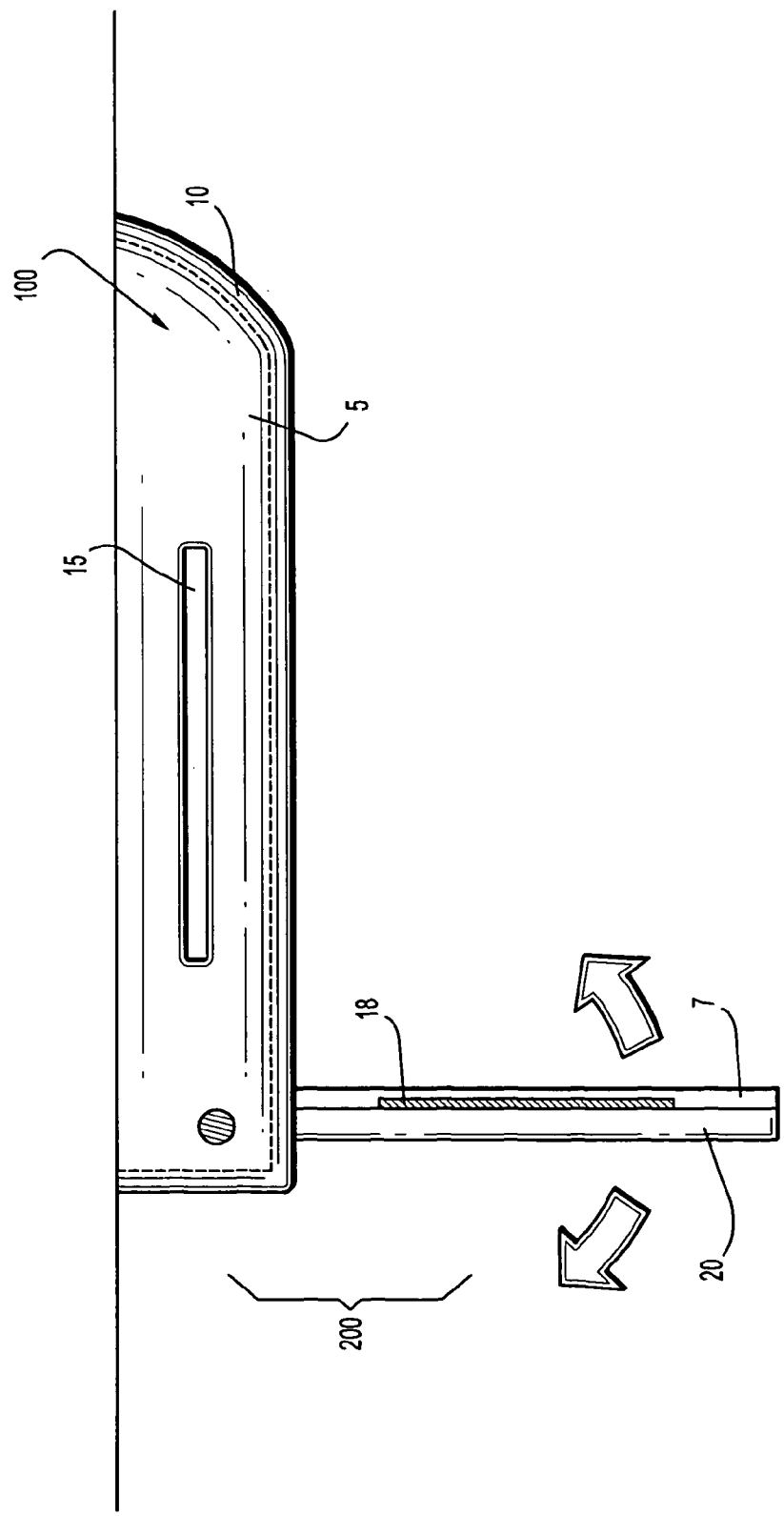
FIG. 4 shows a side view of a cover for an overhead media device according to an embodiment of the present invention.

FIG. 1 shows a cover 200 for a media device 100 for a vehicle according to an embodiment of the present invention. Referring to FIG. 1, the media device 100 comprises a console 5 and a display 7 attached to the console 5. The media device 100 may further comprise a hinge (not shown) connecting the display 7 to the console 5. The media device 100 can be positioned overhead in the vehicle as shown in FIG. 4.

The console 5 includes, for example, one or more media players such as a compact disc (CD) player, a digital video disk (DVD) player, a video cassette player (VCP), a processing unit for reading a flash memory device, a hard drive or mass storage device, and/or a memory card reader. The media players in the console 5 receive data from data sources such as a compact disc, a digital video disk, a video cassette, a hard drive, a flash memory device, memory card or a mass storage device for displaying the data, such as, for example, a video program/movie, on the display 7. An opening 3 can be used to receive the data sources. The display 7 can be constructed using any of one or more known display technologies, such as, for example, liquid crystal display (LCD) technology.

The cover 200 for enclosing the media device 100 comprises a trim part 10 and a surface part 20. The trim part 10 substantially encloses an exposed perimeter of the media device 100. The trim part 10 has a first opening 17 for receiving the console 5. The trim part 10 has dimensions approximately equal to the size of the console 5 so that the console 5 fits into the trim part 10. The trim part 10 further includes a second opening 15 for receiving data source(s). The second opening 15 of the trim part 10 is aligned with an opening 3 in the console 5. The second opening 15 of the trim part 10 may be aligned with a port or jack (not shown) in the console 5 such as, for example, a USB port or an audio/video or headphone jack. The surface part 20 is coupled to the trim part 10 and substantially covers a remaining exposed surface of the media device 100. For example, the surface part 20 covers a back surface of the display 7.

Figure 2:
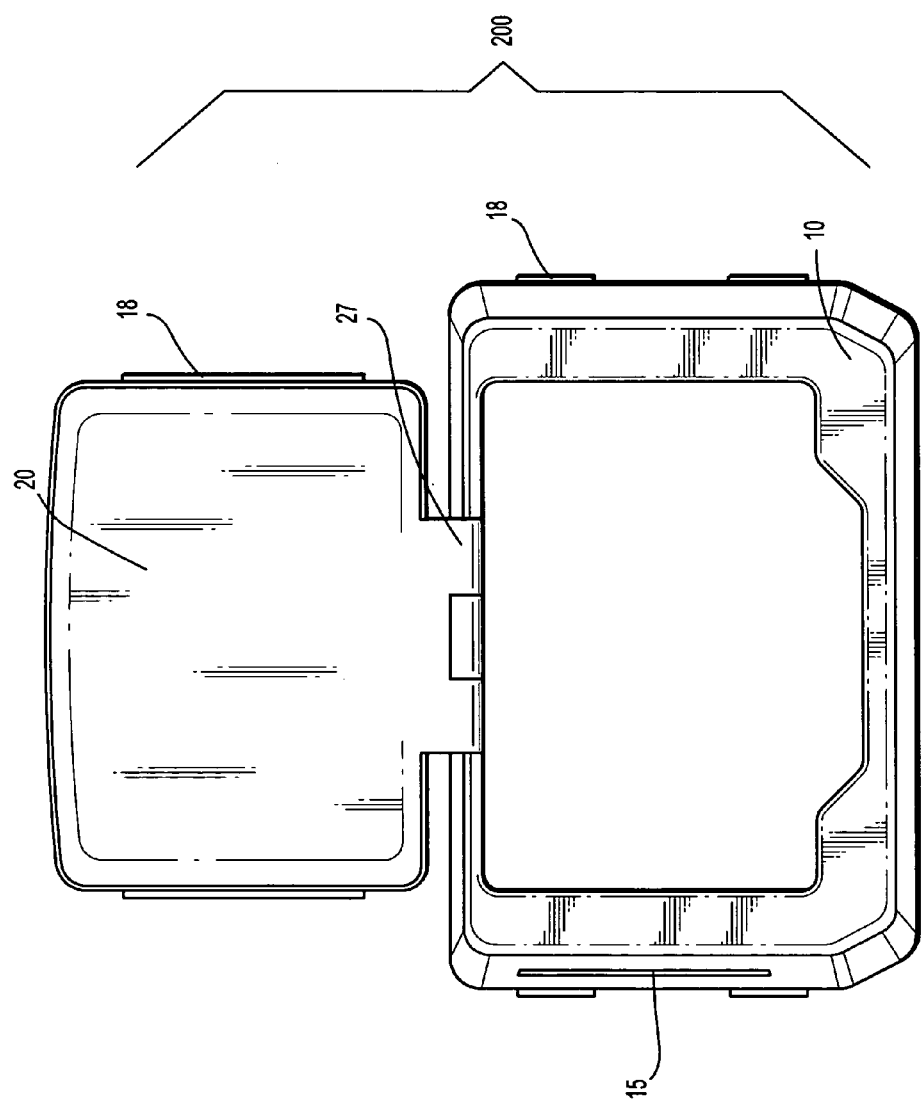
FIG. 2 is a plan view of a cover for an overhead media device according to an embodiment of the present invention.

Referring to FIGS. 1 and 2, the cover 200, according to an embodiment of the present invention, can be readily attached to and removed from the media device 100 without tools. Alternatively, the cover 200 may be permanently attached to the media device 100. The cover 200 utilizes any one or combination of a variety of retention features that provide stability while permitting easy attachment. In particular, the trim part 10 can be coupled to the console 5 and the surface part 20 can be coupled to the display 7 using, for example, a snap-on mechanism.

In an embodiment of the invention, the sides of the trim part 10 and/or surface part 20 can be flexed outward to wrap around the sides of the console 5 and/or display 7. Once the trim and surface parts 10, 20 are in position, the sides of the trim part and surface parts 10, 20 flex inward to engage and hold to the sides of the console 5 or display 7. Accordingly, the trim and surface parts 10, 20 may comprise a flexible material such as plastic.

In another embodiment of the present invention, flexible clip portions 18 are formed along peripheral regions of the trim part 10 and the surface part 20. The flexible clip portions 18 flex outward to wrap around the sides of the console 5 or the display 7. Once the trim part 10 or the surface part 20 is in position, the flexible clip portions 18 flex inward to engage the sides of the console 5 or display 7 to form a friction fit to sides of the console 5 and/or to the display 7. As shown in FIGS. 2 and 4, the flexible clip portions 18 can be a long continuous portion or multiple shorter portions.

Figure 5C:
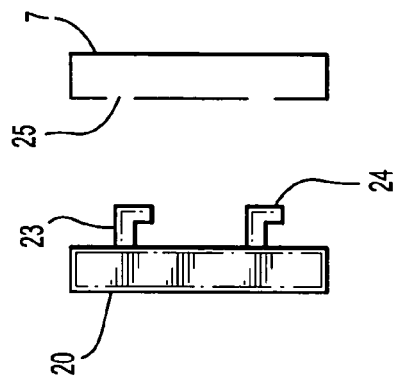
FIGS. 5A-5C show mechanisms for attaching a cover to media device according to embodiments of the present invention.
Figure 5B:
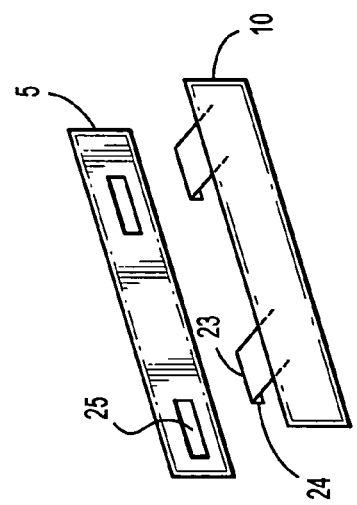
Figure 5A:
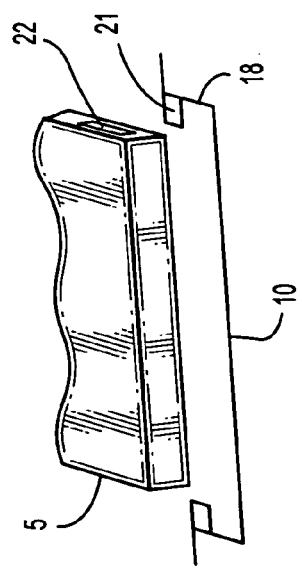

Referring to FIG. 5A, in another embodiment, the flexible clip portion 18 can include a protrusion 21 that snaps into a recessed portion 22 on the console 5 or the display 7.

Referring to FIGS. 5B and 5C, the console 5 and the display 7 may include a protrusion(s) 23 having an angled end 24 which fits into a recessed portion(s) 25 to hook the trim part 10 and/or the surface part 20 to the console 5 and/or the display 7.

Thus, the trim part 10 and the surface part 20 can be attached to and removed from the console 5 and the display 7, easily and repetitively without damage for users changing the cover 200. Alternatively, the trim part 10 and the surface part 20 can be permanently coupled to the console 5 and the display 7, respectively by using, for example, fixing devices such as adhesives, screws, or bolts.

The surface part 20 can be coupled to the trim part 10 using a hinge 27. The hinge 27 is preferably fixed to the trim part 10 using conventional methods, such as screws, molding, adhesives or the like. The hinge 27 may be any hinge sufficient to allow movement along one or multiple axes, (e.g., x, y, z or any combination thereof). Accordingly, the surface part 20 pivots with respect to the trim part 10 and, in turn, with respect to the console in tandem with the display 7.

In an embodiment of the present invention, the surface part 20 and the trim part 10 may comprise two separate units respectively coupled to the display 7 and the console 5. Alternatively, the surface part 20 and the trim part 10 may be joined as a single unit which is folded at the hinge 27.

Figure 3:
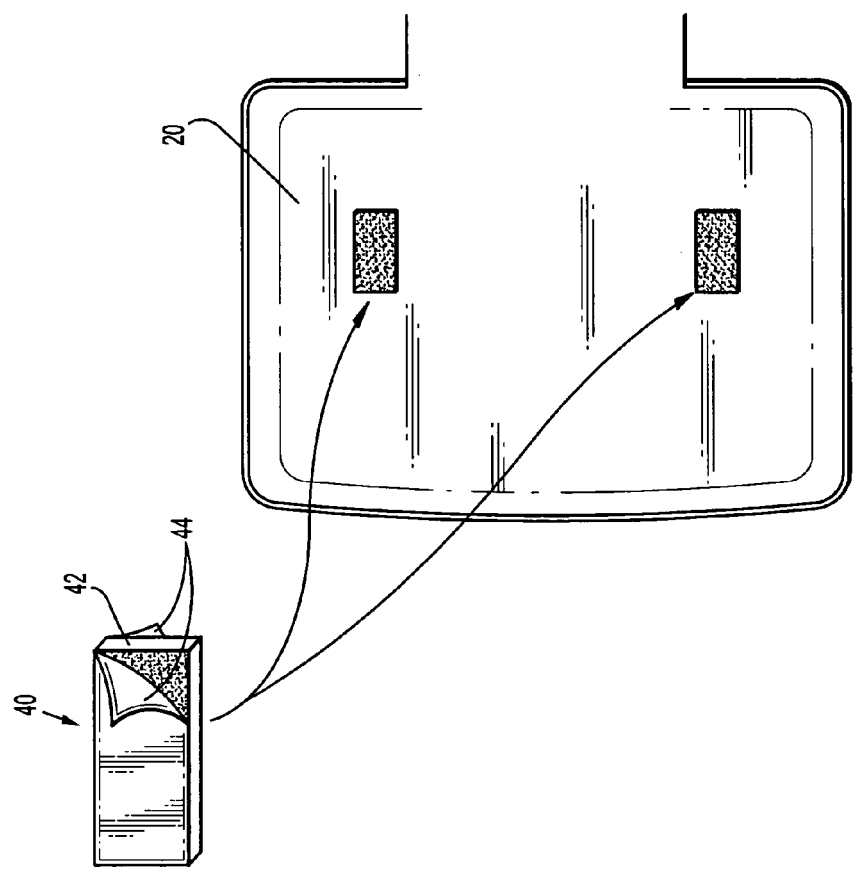
FIG. 3 shows a mechanism for attaching a cover to a media device according to an embodiment of the present invention.

The surface part 20 can be coupled to the display 7 using the mechanisms described in connection with FIGS. 2, 4 and 5A-5C above. Alternatively, the surface part 20 is coupled to the display 7 using an adhesive. The adhesive includes, for example, a two-sided tape, glue and rubber cement. Referring to FIG. 3, two-sided tape 40 includes an adhesive strip 42 and release sheets 44. The release sheets 44 are removed from the adhesive strip 42 to expose an adhesive coated surface thereunder. By applying the adhesive strip 42 to a surface of either the surface part 20 or the display 7, the surface part to the display 7 can be secured. Two-sided tape 40 may also be used to couple the trim part 10 to the console 5.

FIG. 4 shows the cover 200 and the media device 100 combined according to an embodiment of the present invention. Referring to FIG. 4, the trim part 10 encloses the console 5 positioned overhead in the vehicle. The surface part 20 is attached to the back of the display 7 with the snap-on mechanism using, for example, the flexible clip portions 18. The display 7 pivots with respect to the console 5 and the surface part 20 pivots with the display 7.

Figure 6:
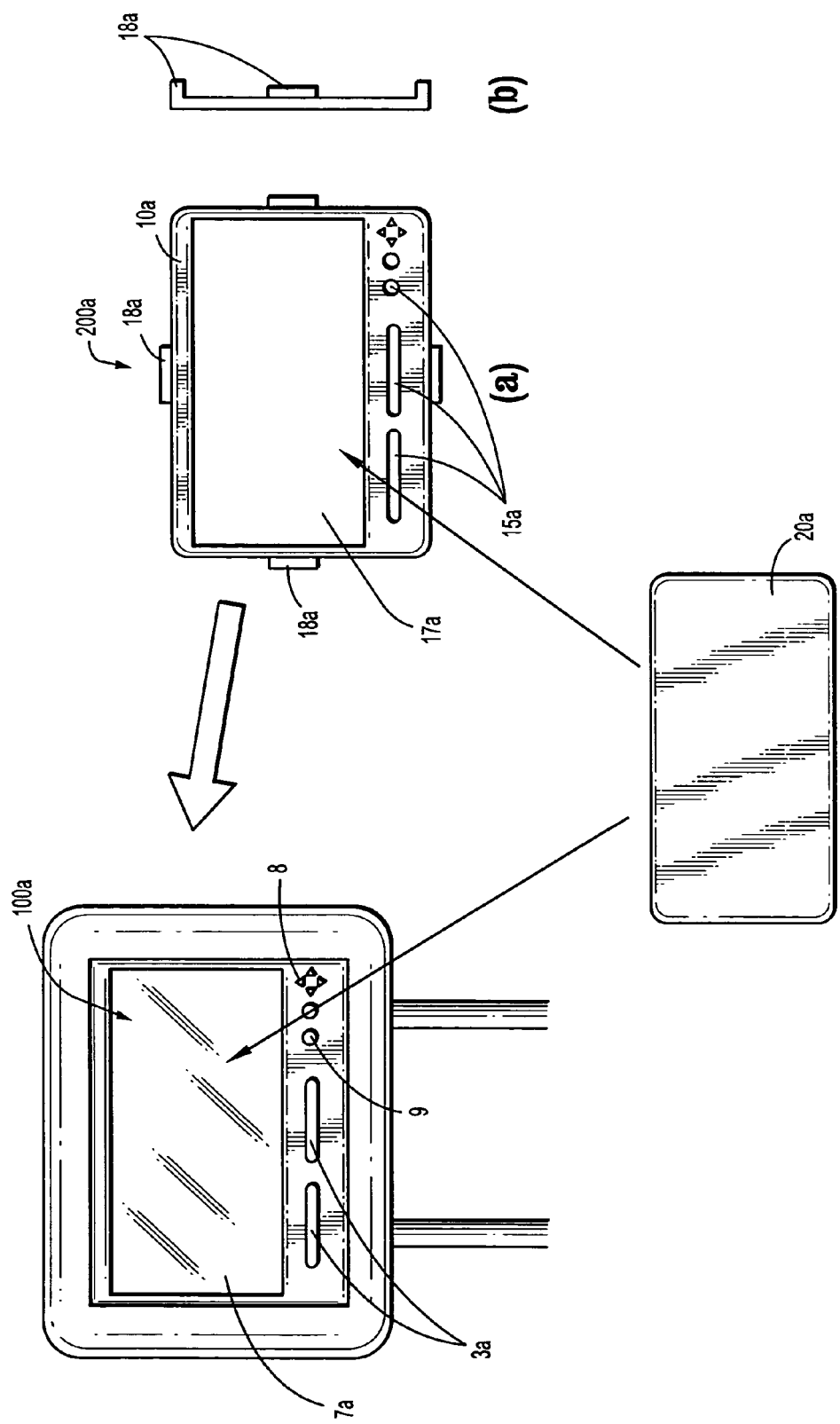
FIG. 6 shows a cover for a headrest media device according to an embodiment of the present invention.

Referring to FIG. 6, a cover 200a for enclosing a media device 100a positioned in a headrest is shown. In another embodiment; the media device 100a can be positioned in a backrest of a vehicle seat. FIG. 6(a) is a front view and FIG. 6(b) is a side view of the cover 200a.

The cover 200a for the media device 100a comprises a trim part 10a. The trim part 10a substantially encloses an exposed perimeter of the media device 100a. The trim part 10a includes a first opening 17a for exposing the display screen 7a. The first opening 17a may comprise a window comprising a transparent material through which video can be viewed. The trim part 10a further includes a second opening(s) 15a aligned with an opening 3a, ports or jacks 9 and/or control buttons 8 in the console 5a.

In addition to the trim part 10a, the cover 100a may comprise a display part 20a for covering a display screen when not in use. The display part 20a may be joined to the trim part 10a using a hinge or attach to the trim part 10a using, for example, a snap-on mechanism similar to those described above.

Similar to the cover 200, the cover 200a can be readily attached to and removed from the media device 100a without tools. Alternatively, the cover 200a may be permanently attached to the media device 100a. Similar to the cover 200, the cover 200a may use a variety of retention features such as a snap-on mechanism. For example, flexible clip portions 18a formed on the trim part 10a of the cover 200a permit easy attachment to the console 5a. Thus, the trim part 10a can be attached to and removed from the media device 100a easily and repetitively without damage. Alternatively, the trim part 10a can be permanently coupled to the media device 100a.

The use of the covers 200 or 200a permits dealers to stock a single type of media device, while providing customers with a cover choice from different color covers.

Figure 7:
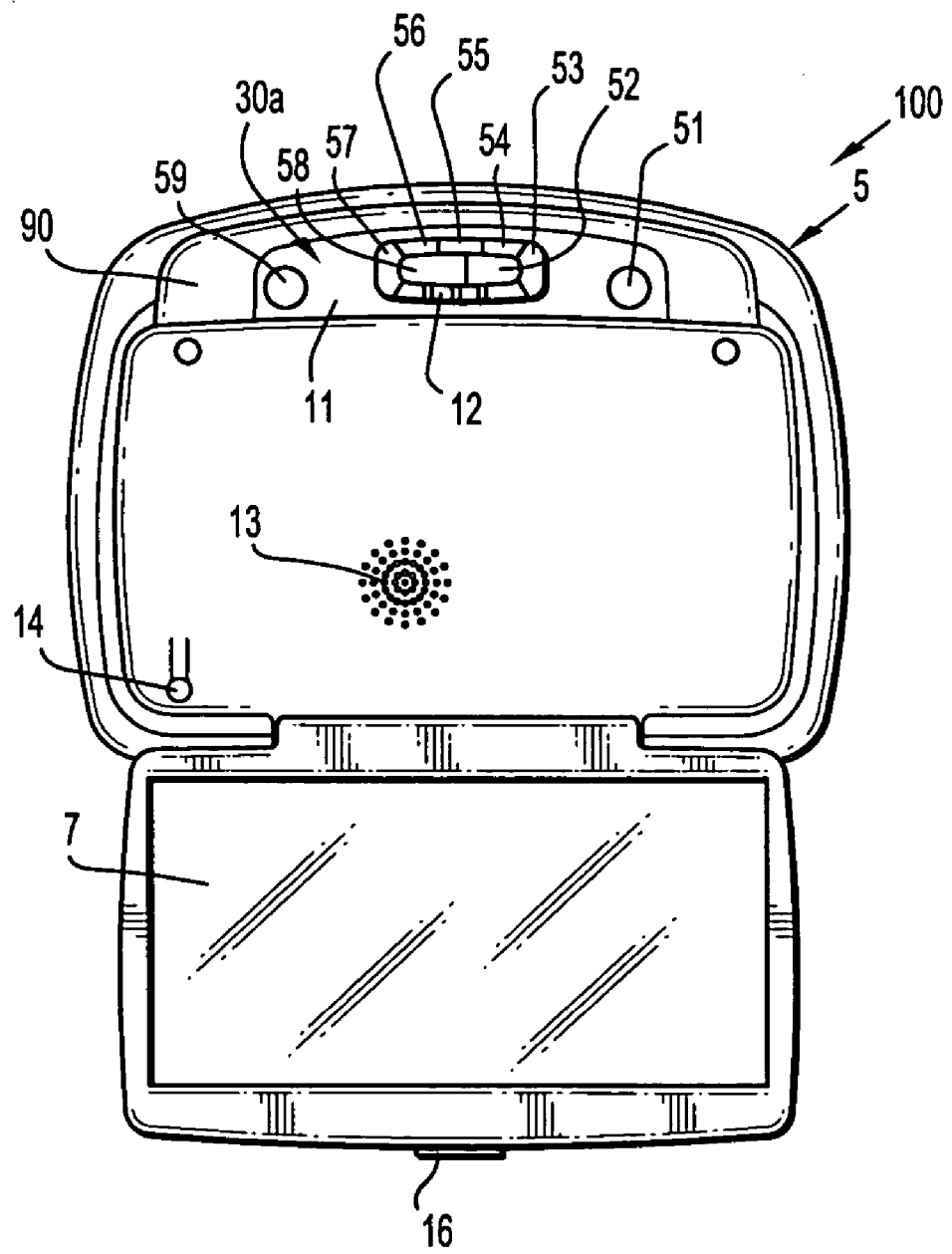
FIG. 7 shows a top view of a media device according to an embodiment of the present invention.

FIG. 7 shows a top view of the media device 100 according to an embodiment of the present invention. The media device 100 may include a switch panel 30a, a dome light panel 90, and a screen release button 16.

Figure 9:
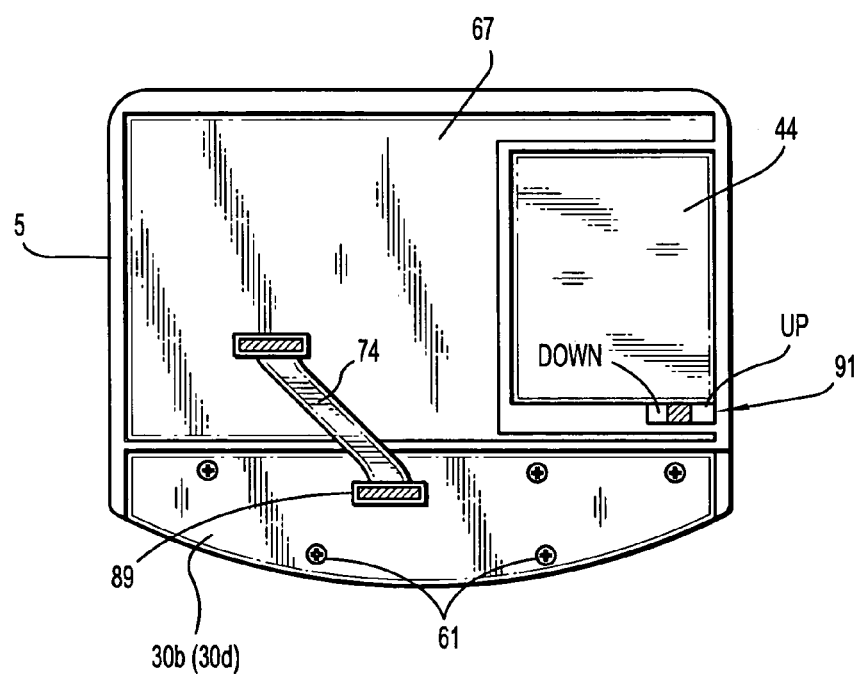
FIG. 9 shows a schematic bottom view of a media device according to an embodiment of the present invention.

The switch panel 30a may include a plurality of buttons such as, for example, an eject button 51, a stop button 52, a source select button 53, volume control buttons 54, 56, a picture select button 55, a frequency source select button 57, a play button 58, a power button 59, and a three position dome light switch 12. The eject button 51 can eject a disc from a disc compartment 44 (FIG. 9). The power button 59 can be used to turn the system of the media device 100 on or off. The power button 59 can be bright when the system is on and dim when the system is off.

The switch panel 30*a* may further include an infrared transmitter and sensor (not shown). The infrared transmitter and sensor can be used to transmit audio to a wireless headphone and/or to operate a remote control for controlling the system or system accessories.

The dome light panel 90 can provide interior illumination using a light source disposed under the dome light panel 90. The light source may include, for example, a light emitting diode (LED). The three position dome light switch 12 can be used to select ON, OFF and AUTO positions. When the three position dome light switch 12 is in the ON position, the LED is turned on to provide light to the dome light panel 90. When the three position dome light switch 12 is in the OFF position, the LED is turned off. When the three position dome light switch 12 is in the AUTO position, the LED can be automatically turned on in conjunction with the vehicle's interior illumination. For example, when the interior of the vehicle has insufficient light, the dome light panel 90 is turned on. When the interior of the vehicle has sufficient light, the dome light panel 90 is turned off.

The console 5 of the media device 100 includes an opening 3 (see FIG. 10), ventilation openings 13, and a display cut off switch 14. The opening 3 can receive a data source such as a digital video disk (DVD). The display cut off switch 14 is used to turn off the display 7 when in the closed position.

Figure 8:
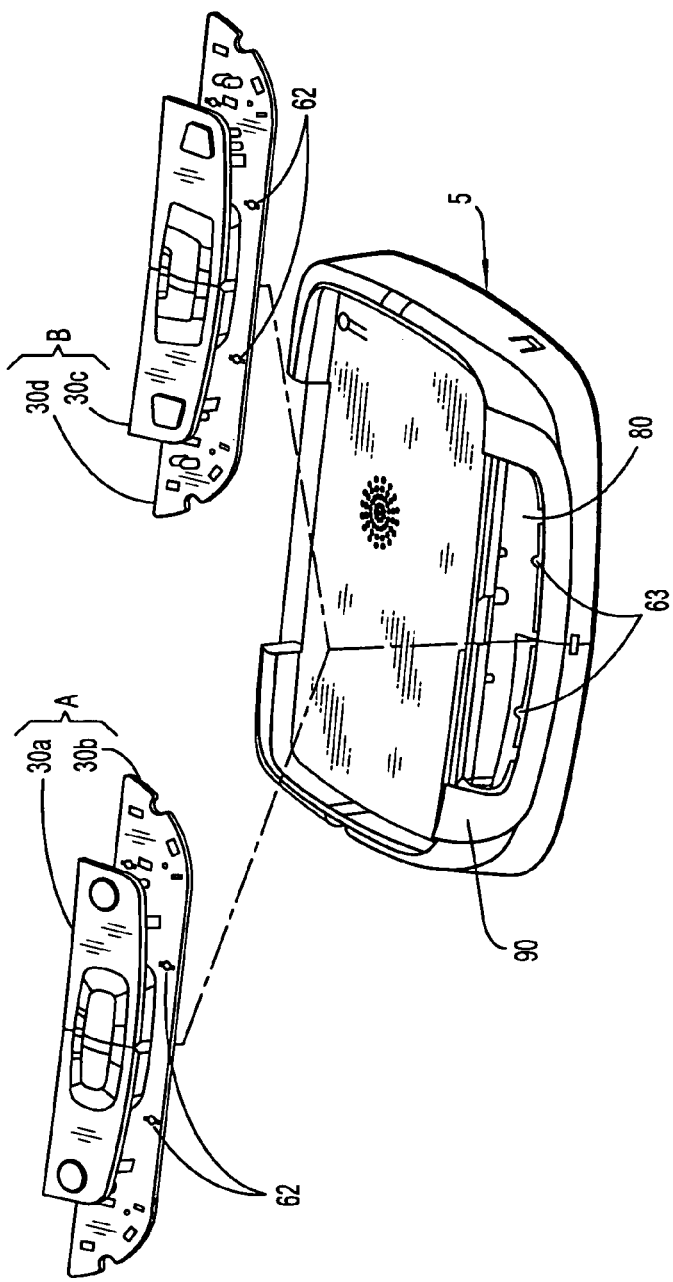
FIG. 8 shows a perspective view of interchangeable switch assemblies and a console of a media device according to an embodiment of the present invention.

FIG. 8 shows a perspective view of interchangeable switch assemblies and the console 5 of the media device 100 according to an embodiment of the present invention. Referring to FIG. 8, the first switch assembly A may include the switch panel 30*a* and a circuit board 30*b*. The second switch assembly B may include a switch panel 30*c* and a circuit board 30*d*. The console 5 may further include a receiving part 80 for receiving the switch assembly A (or B). The circuit board 30*b*, 30*d* may include one or more holes 62. A peripheral region of the receiving part 80 may include one or more holes 63.

Referring to FIG. 9, in an embodiment, the switch assembly A can be replaced by the switch assembly B and vice versa. For example, the switch assembly A can be removed from the receiving part 80 of the console 5, and the switch assembly B can be attached to the console 5.

In an embodiment, the switch assembly A (or B) can be received from the bottom side of the console 5. When the switch assembly A (or B) is secured in the console 5, the one or more holes 62 in the circuit board 30*b* (or 30*d*) and the one or more holes 63 of the peripheral region of the receiving part 80 correspond to each other such that the holes 62, 63 can be mated with each other using, for example, screws 61. Alternatively, the switch assembly A or B may be mounted to the console using mounting mechanism like those described for attaching the cover 200 described in connection with FIGS. 3 and 5A-5C.

A layout of the switch assembly A can be different from a layout of the switch assembly B. In an embodiment, for example, a plurality of buttons in the switch assembly A can be rounded, and a plurality of buttons in the switch assembly B can be square. In an embodiment, the switch panel A can have a blue backlight unit (not shown) disposed on the circuit board 30*b*. The blue backlight unit may comprise, for example, blue LEDs. The switch panel B can have a green backlight unit (not shown) disposed on the circuit board 30*d*. The green backlight unit may comprise, for example, green LEDs.

FIG. 9 shows a schematic bottom view of a media device according to an embodiment of the present invention. Referring to FIG. 9, the console 5 includes a main circuit board 67, a disc compartment 44, a circuit board 30*b* (30*d*), a switch 91, screws 61, a connecting wire 74, and a mating pin connector 89.

The circuit board 30*b* (or 30*d*) can be electrically connected to a main circuit board 67 by, for example, a connecting wire 74. Thus, the circuit board 30*b* (or 30*d*) may include at least a mating pin connector 89 to receive the connecting wire 74. The switch 91 can be used to change colors of an illuminated light pipe 72 (FIG. 10) formed around the opening 3. In an embodiment, when the switch 91 is in an UP position, one or more green LEDs are lit such that the light pipe 72 illuminates green color light. When the switch 91 is in a DOWN position, one or more blue LEDs are lit such that the light pipe 72 illuminates blue color light.

Figure 10:
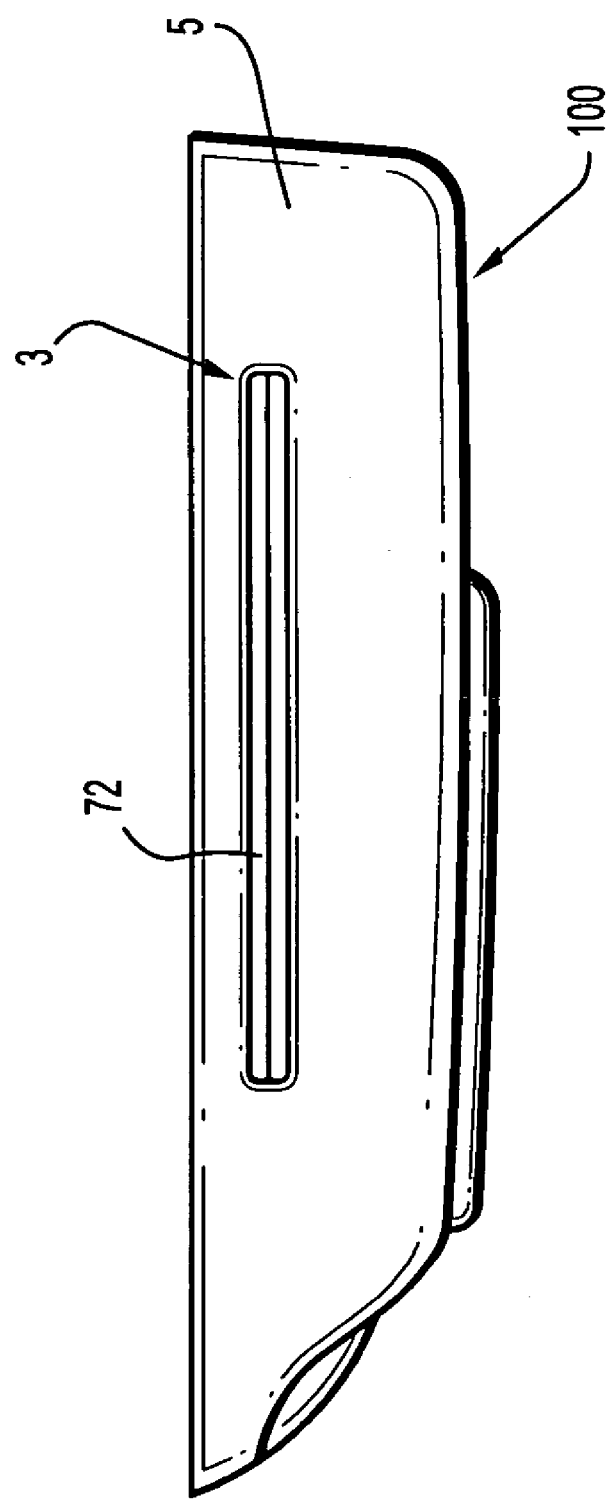
FIG. 10 shows a side view of a media device according to an embodiment of the present invention.

FIG. 10 shows a side view of a media device according to an embodiment of the present invention. Discs, for example, can be loaded and removed through the opening 3. The light pipe 72 can be lit anytime or for a limited time, e.g., at night, for easy loading and removal of the discs. The light pipe 72 can be a transparent plastic material that distributes the LED lighting.

In an embodiment of the present invention, the switch assembly A may have green backlighting and the opening 3 may have a green illuminated pipe 72 around the opening 3. When the switch assembly A is replaced with the switch assembly B, the switch assembly B may have blue backlighting and the opening 3 may have a blue illuminated pipe 72 around the opening 3. As such, the switch assembly and the pipe light can display a same color.

Thus, according to an embodiment of the present invention, the media device 100 is configured such that the branding (e.g., AUDIOVOX® or ADVENT®) of the switch assembly A (or B) in the console 5 can be easily changed. For example, switch assemblies A and B may correspond to AUDIOVOX and ADVENT, respectively. Interchangeable switch assemblies in accordance with embodiments of the present invention can also be applied to a headrest media device.

Although exemplary embodiments have been described herein with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. An overhead media device for a vehicle, comprising:
   an interchangeable switch assembly; and
   a console mounted to an overhead portion of a vehicle, the console including a receiving part accommodating the interchangeable switch assembly and a main circuit board, wherein the main circuit board includes a connecting wire extending from the main circuit board at a bottom surface of the console, wherein the interchangeable switch assembly includes a switch panel and a second circuit board, and wherein the second circuit board includes a pin connector for mating with an end portion of the connecting wire, the pin connector being located at the bottom surface of the console when the interchangeable switch assembly is positioned in the receiving part, wherein the interchangeable switch assembly is mounted to and supported by the console via the receiving part, wherein a peripheral region of the receiving part comprises one or more holes corresponding to one or more holes in the main circuit board.

2. The media device of claim 1, wherein the interchangeable switch assembly further includes a backlight unit for providing light to the switch panel.

3. The media device of claim 1, wherein the switch panel includes a plurality of buttons.

4. The media device of claim 1, wherein the interchangeable switch assembly is mounted to the console by screws.

5. The media device of claim 1, wherein the receiving part has a shape which corresponds to a shape of the interchangeable switch assembly to receive the interchangeable switch assembly therein.

6. The media device of claim 1, wherein the receiving part comprises an open portion in the console receiving the interchangeable switch assembly therein.

* * * * *